March 29, 1966 G. C. SZIKLAI 3,243,739

NEGATIVE REACTIVE CIRCUITRY

Filed Oct. 20, 1960

WITNESSES

Leon J. Laza

James F. Young

INVENTOR

George C. Sziklai

BY Ernest P. Klipfel

ATTORNEY

United States Patent Office 3,243,739

Patented Mar. 29, 1966

3,243,739

NEGATIVE REACTIVE CIRCUITRY

George C. Sziklai, Carnegie, Pa., assignor to Westinghouse Electric Corporation, East Pittsburgh, Pa., a corporation of Pennsylvania Filed Oct. 20, 1960, Ser. No. 63,866
3 Claims. (Cl. 333—80)

The present invention relates generally to negative reactance circuitry and more particularly to negative reactance circuits utilizing negative and positive resistances and a reactance element.

It is desirable to product negative reactances in convenient form for molecular electronic blocks or other electronic systems designs. In such molecular blocks, capacitance is readily obtained. The present invention allows a molecular equivalent of an inductance to be formed by means of a capacitance region. The present invention also provides inductance without a magnetic field for conventional electronic systems designs.

An object of the present invention is to provide a two terminal negative reactance circuit.

Another object of the present invention is to provide a negative reactance circuit capable of compensating for positive reactance within a network.

Another object of the present invention is to provide a network for inverting both the sense and frequency dependence of a preselected reactance.

Further objects and advantages of the present invention will be readily apparent from the following detailed description taken in conjunction with the drawing in which.

Figure 1:
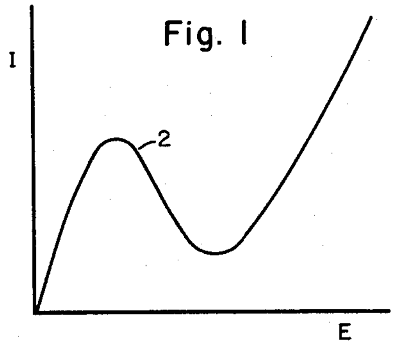
FIGURE 1 is a characteristic curve of the device employed in the present invention.

The present invention utilizes the negative resistance provided by a tunnel junction or by any other electronic means to create a two terminal negative or complementary reactance. FIG. 1 shows the characteristic curve 2 of a tunnel diode. The tunnel diode provides a dynamic negative resistance over a limited range of its characteristics in the form of a single device having only two terminals. The tunnel diode, due to its negative resistance, has been found to be useful in amplifying and in switching circuits. It has been both postulated and demonstrated that the tunnel diode is useful at high frequencies and high temperatures because the negative resistance portion of its characteristic curve is obtained by means of majority carrier conduction. The tunnel diodes used in accordance with the present invention have been designated as —Я to indicate the dynamic negative resistance provided by these diodes. It is to be understood that the tunnel diodes have a voltage thereacross of sufficient magnitude to cause them to be biased into the negative region of their characteristic curve as shown in FIG. 1.

Figure 2:
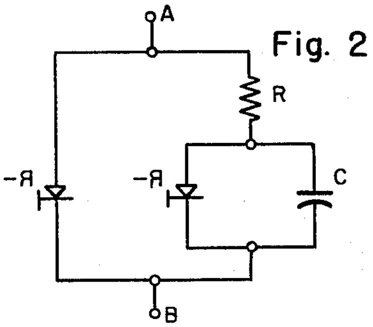
FIG. 2 is a schematic diagram of an illustrative embodiment of the present invention.

FIG. 2 is a schematic diagram of a negative inductive reactance in accordance with the present invention. The two terminal negative inductive reactance comprises a capacitance C, a positive resistance R, and two negative resistances —Я. A negative reactance —Я is connected in a parallel circuit combination with a positive capacitance C. A positive resistance R is connected in a series circuit combination with the parallel circuit combination. The series circuit combination is connected to the terminals A and B of the negative inductive reactance circuit. A second negative resistance —Я is connected across the series circuit combination and also connects the terminals A and B.

It can be seen that the impedance $Z_{AB}$ across the terminals A to B can be represented by the following equation:

$$Z_{AB}=\frac{1}{\dfrac{1}{pC-\dfrac{1}{\text{Я}}+R}-\dfrac{1}{\text{Я}}} \qquad (1)$$

which, when factored out, takes a more simplified form:

$$Z_{AB}=\frac{\text{Я}^2+pC\text{Я}^2R-\text{Я}R}{pC\text{Я}^2-2\text{Я}-pC\text{Я}+R} \qquad (2)$$

The symbol $p$ may be representive of either $j\omega$ or an operator $d/dt$.

Setting the negative resistance —Я equal to the positive resistance R, the impedance across the terminals A, B is in the form:

$$Z_{AB}=-pCR_2 \qquad (3)$$

from whence it can be seen that the actual equivalent inductance value has a magnitude $CR^2$.

If the symbol $p$ is representative of $j\omega$ or an operator $d/dt$, it can be seen that the impedance of the circuit shown in FIG. 2 is:

$$Z_{AB}=-j\omega CR^2 \qquad (4)$$

and the voltage $E_{AB}$ is:

$$E_{AB}=-\frac{di}{dt}CR^2 \qquad (5)$$

Thus, it can be seen that the arrangement shown in FIG. 2 appears to be a short circuit at direct current or extremely low frequencies while it appears to be an open circuit of extremely high frequencies. The circuit as shown has application as a choke to provide a direct current connection by an insulation for high frequency signals.

Figure 3:
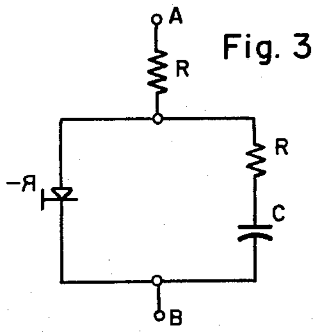
FIG. 3 is a schematic diagram of an alternate embodiment of the present invention.

An alternate embodiment of a two terminal negative inductive reactance circuit is shown in FIG. 3. A positive resistance element R and a capacitance element C are connected in a series circuit combination. A negative resistance element —Я is connected in parallel circuit relationship with the series circuit combination. A second positive resistance element R is connected in series circuit relationship with the parallel circuit, all across the terminals A, B of the negative inductive reactance circuit.

It can be shown that impedance $Z_{AB}$ across the terminals A to B shown in FIG. 3 can be represented as follows:

$$Z_{AB}=\frac{1}{\dfrac{1}{R+\dfrac{1}{j\omega C}}-\dfrac{1}{\text{Я}}}+R=\frac{1}{\dfrac{\text{Я}-R-\dfrac{1}{j\omega C}}{\text{Я}R+\dfrac{\text{Я}}{j\omega C}}}+R \qquad (6)$$

which when factored out takes a more simplified form:

$$Z_{AB}=\frac{\text{Я}Rj\omega C+\text{Я}}{\text{Я}j\omega C-Rj\omega C-1}+R \qquad (7)$$

If, once again, the negative resistance element —Я is made equal in magnitude to the positive resistance element R, $$Z_{AB}=\frac{j\omega CR^2+R}{-1}+R=-j\omega CR^2 \qquad (8)$$

Figure 4:
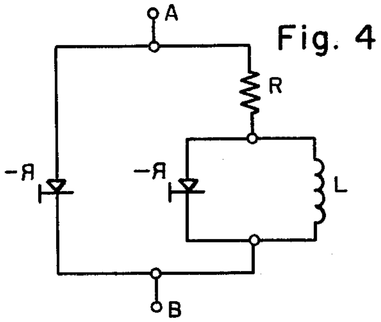
FIG. 4 is a schematic diagram of an alternate embodiment of the present invention shown in FIG. 2.
Figure 5:
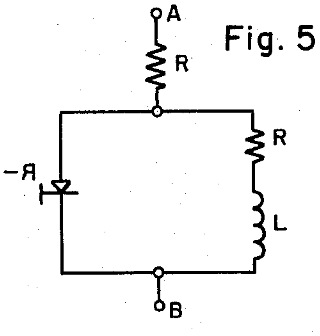
FIG. 5 is a schematic diagram of an alternate embodiment of the present invention shown in FIG. 3.

FIGS. 4 and 5 show counterparts of the circuits illustrated in FIGS. 2 and 3, respectively. Each circuit illustrates a two terminal negative capacitive reactance circuit wherein like elements are designated with identical reference characters used in the preceding figures. An inductance L is inserted in place of the capacitance C. Accordingly, the impedance $Z_{AB}$ across the terminals A to B in FIG. 4 can be represented as follows:

$$Z_{AB}=\frac{1}{\dfrac{1}{\dfrac{1}{\dfrac{1}{pL}-\dfrac{1}{\mathfrak{R}}}+R}-\dfrac{1}{\mathfrak{R}}} \qquad (9)$$

which when simplified:

$$Z_{AB}=\frac{pL\mathfrak{R}+\mathfrak{R}R-pLR}{\mathfrak{R}^2-2pL\mathfrak{R}-\mathfrak{R}R+pLR} \qquad (10)$$

By making the magnitude of the negative resistance elements $-\mathfrak{R}$ each substantially equal to the magnitude of the positive resistance element R $$Z_{AB}=-\frac{R^2}{pL} \qquad (11)$$

If the symbol $p$ is representative of $j\omega$ or the operator $d/dt$ it can be seen that the impedance of the circuit shown in FIG. 4 is:

$$Z_{AB}=-\frac{1}{j\omega L/R^2} \qquad (12)$$

and the voltage $E_{AB}$ is:

$$E_{AB}=-\frac{R^2}{L}\int i\,dt \qquad (13)$$

Referring to FIG. 5, it can be seen that the impedance across the terminals A, B may be represented $$Z_{AB}=\frac{1}{\dfrac{1}{R+j\omega L}-\dfrac{1}{\mathfrak{R}}}+R \qquad (14)$$

which may be simplified to $$Z_{AB}=\frac{\mathfrak{R}R+\mathfrak{R}j\omega L}{\mathfrak{R}-R-j\omega L}+R \qquad (15)$$

Setting the negative resistance $-\mathfrak{R}$ to be equal in magnitude to the positive resistance R, $$Z_{AB}=-\frac{R^2}{j\omega L} \qquad (16)$$

The Equations 12 and 16 demonstrate that the circuits shown in FIGS. 4 and 5 provide a negative capacitance across the terminals A, B with an equivalent capacitance value of $L/R^2$. The circuits shown in FIGS. 4 and 5 appear to be an open circuit at extremely low frequencies and a short circuit at extremely high frequencies.

Figure 6:
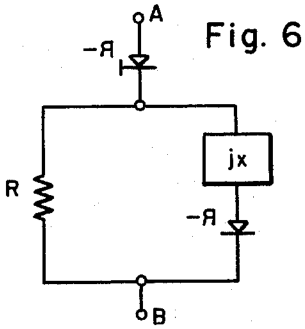
FIG. 6 is a schematic diagram of another alternate embodiment of the present invention.

Another configuration consisting of a reactance with two negative resistances $-\mathfrak{R}$ and one positive resistance R is shown in FIG. 6 where the same inversion, both in sign and frequency dependence, is obtained as in the previous figures. The reactance has been simply indicated as jX with the like elements used in the previous figures designated with identical reference characters. It can be shown that the impedance $Z_{AB}$ of the circuit illustrated in FIG. 6 takes the form $$Z_{AB}=-\frac{R^2}{jX} \qquad (17)$$

Figure 7:
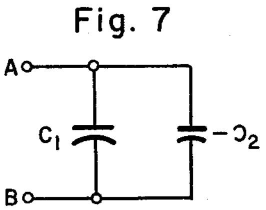
FIGS. 7 and 8 are schematic diagrams of illustrative embodiments of the present invention in a network.

An important application of the circuits shown in FIG. 4 or 5 is the removal of incidental, undesired positive capacitance effects. Such incidental, positive capacitances limit the bandwidth in the upper frequency operations of amplifiers as well as imposing serious limitations on the upper frequencies of oscillators. As shown in FIG. 7, assume an undesirable positive capacitance $C_1$ across the terminals A, B. If a negative capacitance, $-O_2$, such as obtained from the two terminal negative capacitance circuit shown in FIG. 4, is connected across the undesirable capacitance $C_1$, the two conductances are additive; and if the capacitance $C_1$ is equivalent in magnitude to $L/R^2$, the overall conductance is going to be zero. The impedance of the combination shown in FIG. 7 is going to be infinite at all frequencies. Thus, the negative capacitance $-O_2$, will provide an elimination or substantial reduction of the unwanted capacitances in a circuit.

Figure 8:
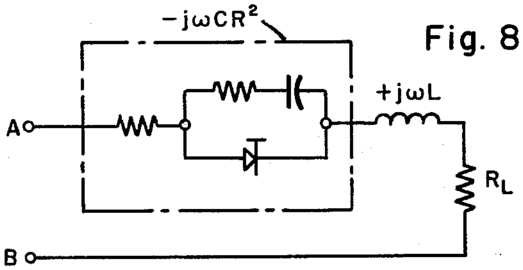

If an undesirable inductance is to be cancelled, as in FIG. 8, a negative inductance such as shown in FIG. 3 may be used. Assuming an undesirable inductance of magnitude $j\omega L$ in series with a load resistance $R_L$ in a load circuit, the negative inductive reactance $-j\omega CR^2$ may be adjusted to have a magnitude $CR^2$ equal to L. Since the load resistance $R_L$ is in series circuit relationship with the negative inductive reactance, the positive resistance R having one side connected to the terminal A may be reduced in magnitude so that the sum of the positive resistor R and the load resistance $R_L$ is equal to the negative resistance $-\mathfrak{R}$. Thus, if an undesirable inductance is placed in series circuit with a negative inductive reactance, as provided by the circuit shown in FIG. 3, the current in the series circuit will level off until the negative resistance $-\mathfrak{R}$ ceases to be a pure negative resistance. The usual faster attenuation with increases in frequency is thereby avoided.

While the present invention has been described with a degree of particularity for the purposes of illustration, it is to be understood that all equivalents, modifications, and alterations within the spirit and scope of the present invention are meant to be included. While the circuits shown have been illustrated as lumped component circuits, it is to be understood that the circuits described may be obtained in a single material by various arrangements of junctions. In other words, two tunnel junctions may be obtained on a single semiconductor slab; an inverse biased junction may provide the capacitance, and the resistance may be obtained through the inherent resistive behavior of the semiconductor. A lumped positive inductance may be obtained from certain forward biased time delay junctions. Not only does the present invention have application in molecular electronic blocks but in other electronic systems designed as well.

I claim as my invention:

1. An inversion circuit, both in sense and frequency dependence, comprising, in combination: a parallel circuit combination of a negative resistance element and a reactance element of preselected sense and frequency dependence; a series circuit combination of a positive resistance element and said parallel circuit combination; a second negative resistance element connected across said series combination; the magnitude of the negative resistance elements each being substantially equal to the magnitude of the positive resistance element.

2. A negative inductance circuit comprising, in combination: a parallel circuit combination of a negative resistance element and a capacitance element; a series circuit combination of a positive resistance element and said parallel circuit combination; a second negative resistance element connected across said series circuit combination; the magnitude of the negative resistance elements each being substantially equal to the magnitude of the positive resistance element.

3. A negative capacitance circuit comprising, in combination: a parallel circuit combination of a negative resistance element and an inductance element; a series circuit combination of a positive resistance element and said parallel circuit combination; a second negative resistance element connected across said series circuit combination; the magnitude of the negative resistance elements each being substantially equal to the magnitude of the positive resistance element.

References Cited by the Examiner

UNITED STATES PATENTS

| | | | |
|---|---|---|---|
| 2,788,496 | 4/1957 | Linvill | 333—80 |
| 2,800,586 | 7/1957 | Towner | 333—80 |

References Cited by the Applicant

OTHER REFERENCES

IRE Proceedings, July 1959, pp. 1268, 1269.

Schultz: Amplifier Design, May 27, 1960, Electronics, pp. 110–112.

Sommers: Tunnel Diodes, Preceedings of IRE, July 1959, pp. 201–206.

FOREIGN PATENTS

| | | |
|---|---|---|
| 278,036 | 9/1927 | Great Britain. |

OTHER REFERENCES

Proceedings of the Institute of Radio Engineers, vol. 19, No. 4, April 1931, "Negative Circuit Constants," by L. C. Verman, pp. 676 to 681.

Philosophical Magazine, February 1934, pp. 230–232, entitled "Negative Lengths of Telephone Line," by A. C. Bartlett.

HERMAN KARL SAALBACH, *Primary Examiner.*

BENNETT G. MILLER, *Examiner.*

A. J. ENGLERT, W. K. TAYLOR, *Assistant Examiners.*